(12) United States Patent
Cuervo et al.

(10) Patent No.: US 8,244,263 B2
(45) Date of Patent: Aug. 14, 2012

(54) PRIMARY SERVING GATEWAY RESOLUTION

(75) Inventors: Fernando Cuervo, Dunrobin (CA); Ajay Kirit Pandya, Ottawa (CA)

(73) Assignee: Alcatel Lucent, Paris (FR)

( * ) Notice: Subject to any disclaimer, the term of this patent is extended or adjusted under 35 U.S.C. 154(b) by 125 days.

(21) Appl. No.: 12/787,862

(22) Filed: May 26, 2010

(65) Prior Publication Data

US 2011/0292885 A1 Dec. 1, 2011

(51) Int. Cl.
*G06F 15/16* (2006.01)
(52) U.S. Cl. ........................................ 455/450; 455/406
(58) Field of Classification Search ................ 455/406, 455/450; 709/220, 223, 238
See application file for complete search history.

(56) References Cited

U.S. PATENT DOCUMENTS

2011/0202660 A1* 8/2011 Pandya et al. ................. 709/227
* cited by examiner

*Primary Examiner* — Sam Bhattacharya
(74) *Attorney, Agent, or Firm* — Kramer & Amado P.C.

(57) ABSTRACT

Various embodiments relate to a system and related method for handling requests from a user device in a wireless communications network. Various embodiments relate to a Policy and Charging Rules Node (PCRN) attempting to bind an IP-CAN session established in a Packet Data Network gateway (PGW) with a gateway control session established in a serving gateway (SGW). In instances when the IP-CAN session and gateway control session no longer match, the PCRN may wait to receive a subsequent message from the PGW and/or SGW. When the PCRN does not receive the subsequent message containing a matching session, the PCRN may kill the sessions in all the relevant gateways. This may cause the system to reestablish a new, matching connection instead of remaining in a hanging state.

20 Claims, 5 Drawing Sheets

PRIMARY SERVING GATEWAY RESOLUTION

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed solely for voice communications has recently grown into a heterogeneous system that enables access to communications platforms such as text messaging, multimedia streaming along with general Internet access. To support such applications, service and infrastructure providers have built new networks over existing voice communication infrastructure. As evidenced by second and third generation networks, voice services must be carried over dedicated voice channels toward a traditional circuit-switched core, while other services, such as IP-enabled data and communications may be transmitted over a different packet-switched core, following Internet protocol (IP). This has led to unique problems, including, for example, application provision, metering and charging, and quality of experience (QoE) assurance.

One recent attempt to enhance the dual-core approach of the second (2G, 2.5G) and third generations (3G) of mobile telecommunications standards defined by the International Telecommunications Union has been in the form of a new set of standards. The Third Generation Partnership Project (3GPP) has recommended a new network scheme deemed 'Long Term Evolution' (LTE). Under the new standards, all communications in an LTE network are carried over an IP channel from user equipment (UE), such as a mobile phone or smartphone, to an all-IP core named the Evolved Packet Core (EPC). The EPC may then provide gateway access to other networks, while also ensuring an acceptable QoE for a user's network activity and properly charging the subscriber for such activity The 3GPP generally describes the components of the EPC and their interactions with each other in some technical specifications, specifically, 3GPP TS 29.212, 3GPP TS 29.213, and 3GPP TS 29.214, which describe components such as a Policy and Charging Rules Function (PCRF), Policy and Charging Enforcement Function (PCEF), and Bearer Binding and Event Reporting Function (BBERF) of the EPC. These technical specifications also provided some details regarding the interactions between these components. These specifications gave some guidance on how the EPC could provide reliable data services to users, while also reliably charging subscribers for use of the IP network.

For example, 3GPP TS 29.212, 3GPP TS 29.213, and 3GPP TS 29.214 provide some guidance on handling connectivity when multiple gateways may be used to connect a specific user device to the EPC. Specifically, the specifications provide some guidance of assigning one of the candidate gateways as a primary gateway. However, the algorithm outlined by the specifications may not work in all situations and the specification does not consider such instances.

In view of the foregoing, it would be desirable to provide a system and method more capable of handling such occurrences. In particular, it would be desirable to provide a system that may take appropriate action when an algorithm to choose a specific gateway is unsuccessful.

SUMMARY

In light of the present need for a method for handling the designation of candidate gateways by the PCRN, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a method of a Policy Charging and Rules Node (PCRN) handling a user device in a wireless communications network. The method includes one or more of the following steps, such as receiving a first request from a first serving gateway, receiving a second request from a second serving gateway, attempting to assign either the first or second serving gateway as a primary serving gateway based on a plurality of attributes associated with the first and second serving gateways, and assigning at least the first and second serving gateways as non-primary when the attempt to assign the primary serving gateway is unsuccessful.

Various other embodiments may also relate to a system for handling a user device in a wireless communications network. The system includes one or more of the following components, such as at least a first and second gateway for receiving a user request from a user device to establish service, the first gateway generating a first request and the second gateway generating the second request, and a PCRN for receiving at least the first and second requests from the first and second gateways. The PCRN attempts to assign either the first or second gateway as a primary gateway based on a plurality of attributes associated with the first and second gateways, and assigns at least the first and second serving gateways as non-primary when the attempt to assign the primary serving gateway is unsuccessful.

Various embodiments may also relate to a method of a PCRN handling a user device in a wireless communications network. The method may include one or more of the following steps, such as binding an IP-CAN (Internet Protocol Connectivity Access Network) session received from a Packet Data Network gateway (PGW) to a first gateway control session received from a first serving gateway, wherein the IP-CAN Type of the serving gateway matches the IP-CAN session, and the provided address or addresses of the serving gateway matches the AN-GW-Address comprising an IPv4 address and/or IPv6 prefix in the IP-CAN Session, and determining that the IP-CAN Type of the gateway control session no longer matches the IP-CAN session or the AN-GW-Address in the IP-CAN Session no longer matches the address or addresses of the serving gateway. Such embodiments may also involve waiting to receive a binding message from at least one of the first serving gateway and a second serving gateway, connecting to the at least one of the first and second serving gateways when the PCRN receives the binding message from at least one of the first and second serving gateways, with the gateway control session in the binding message containing an IP-CAN Type matching the IP-CAN session and an AN-GW-Address matching the AN-GW-Address of the IP-CAN session, and signaling the PGW and the at least first and second serving gateways to kill each gateway control session and the IP-CAN session when the PCRN does not receive the binding message from at least one serving gateway containing an IP-CAN Type matching the IP-CAN session of the PGW and an AN-GW-Address matching the AN-GW address of the IP-CAN session.

Various embodiments may also relate to a system for handling a user device in a wireless communications network. The system includes one or more of the following components, such as a PGW for generating a establishing message to establish an IP-CAN session, at least a first and second serving gateway for receiving a user request from a user device to establish a connection with the wireless communications network, the first gateway generating a first request and the second gateway generating the second request, and a PCRN for receiving at least the first and second requests from the first and second gateways. The PCRN binds the IP-CAN session received in the establishing message from the PGW to a first gateway control session received from the first serving gateway, wherein the IP-CAN Type of the first serving gateway matches the IP-CAN session and the AN-GW-Address of the serving gateway matches the AN-GW-Address of the IP-CAN session, determines that the IP-CAN Type of the first gateway control session or the AN-GW-Address of the serving gateway no longer match that of the IP-CAN session, waits to receive a binding message from at least one of the first and second serving gateways, connects to the at least one of the first and second serving gateways when the PCRN receives the binding message from at least one of the first and second serving gateways and the gateway control session in the binding message contains an IP-CAN Type and an AN-GW-Address matching the IP-CAN session, and signals the PGW and the serving gateways to kill the gateway control session and the IP-CAN session when the PCRN does not receive the binding message from at least one serving gateway containing an IP-CAN Type or an AN-GW-Address matching that of the IP-CAN session of the PGW.

It should be apparent that, in this manner, various exemplary embodiments enable dynamic handling of user requests in a system with multiple serving gateways. Particularly, by enabling the PCRN to control connections with multiple gateways, the user device may avoid hanging status if no primary gateway is assigned.

BRIEF DESCRIPTION OF THE DRAWINGS

In order to better understand various exemplary embodiments, reference is made to the accompanying drawings wherein.

DETAILED DESCRIPTION

Referring now to the drawings, in which like numerals refer to like components or steps, there are disclosed broad aspects of various exemplary embodiments.

Figure 1:
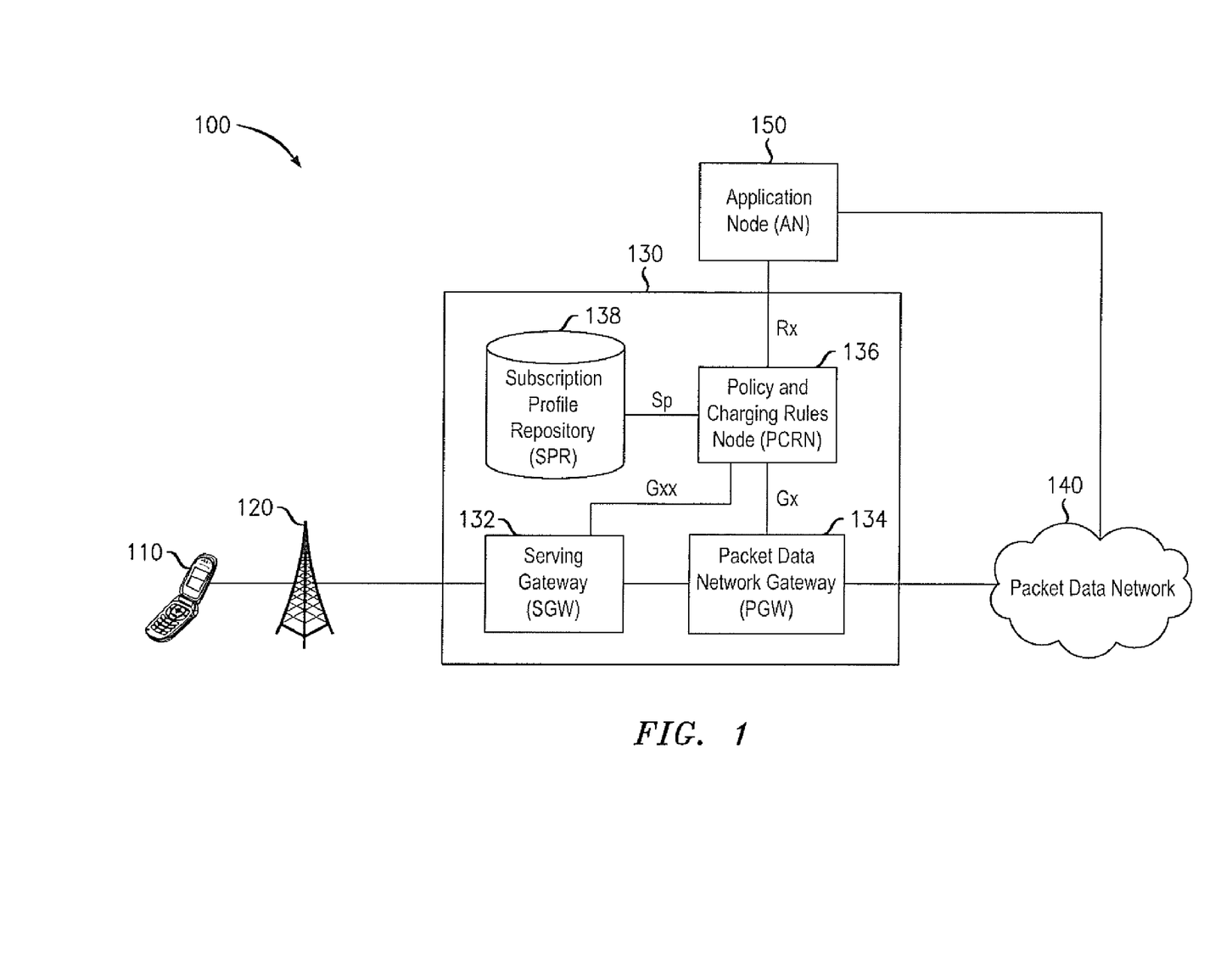
FIG. 1 illustrates an exemplary subscriber network for providing various data services.

FIG. 1 illustrates an exemplary subscriber network 100 for providing various data services. Exemplary subscriber network 100 may be a telecommunications network or other network for providing access to various services. Exemplary subscriber network 100 may include at least one piece of user equipment (UE) 110, a base station 120, an evolved packet core (EPC) 130, a packet data network 140, and an application node (AN) 150.

User equipment (UE) 110 may be a device that communicates with the packet data network 140 for providing the end-user with a data service. Such data service may include, for example, voice communication, text messaging, multimedia streaming, and Internet access. Specifically, in various exemplary embodiments, UE 110 is a personal or laptop computer, wireless e-mail device, cellular phone, television set-top box, or any other device capable of communicating with other devices via the EPC 130.

Base station 120 may be a device that enables communication between UE 110 and the EPC 130. For example, the base station 120 may be a base transceiver station such as an evolved nodeB (eNodeB) as defined by 3GPP standards. Thus, the base station 120 may be a device that communicates with the UE 110 via a first medium, such as radio communication, and communicates with the EPC 130 via a second medium, such as an Ethernet cable. Base station 120 may be in direct communication with the EPC 130 or may communicate via a number of intermediate nodes (not shown in FIG. 1). In various embodiments, multiple base stations (not shown) similar to the base station 120 may be present to provide mobility to the UE 110. In various alternative embodiments, UE 110 may communicate directly with the EPC 130. In such embodiments, the base station 120 may not be present.

Evolved packet core (EPC) 130 may be a device or network of devices that provides the UE 110 with gateway access to the packet data network 140. EPC 130 may further charge a subscriber for use of provided data services and ensure that particular quality of experience (QoE) standards are met. Thus, the EPC 130 may be implemented, at least in part, according to the 3GPP TS 29.212, 29.213, 29.214 technical specifications. Accordingly, the EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by the UE 110. SGW 132 may forward such packets towards the PGW 134. SGW 132 may perform a number of functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile Internet Protocol (PMIP) standard, the SGW 132 may include a Bearer Binding and Event Reporting Function (BBERF). In various exemplary embodiments, the EPC 140 may include multiple SGW (not shown) similar to the SGW 132 and each SGW may communicate with multiple base stations (not shown) similar to the base station 120.

Packet data network gateway (PGW) 134 may be a device that provides gateway access to the packet data network 140. PGW 134 may be the final device within the EPC 130 that receives packets sent by user equipment 110 toward the packet data network 140 via the SGW 132. PGW 134 may include a policy and charging enforcement function (PCE') that enforces policy and charging control (PCC) rules for each service data flow (SDF). Thus, the PGW 134 may be a policy and charging enforcement node (PCEN). PGW 134 may include a number of additional features, such as, for example, packet filtering, deep packet inspection, and subscriber charging support.

Policy and charging rules node (PCRN) 136 may be a device that receives requests for services, generates PCC rules, and provides PCC rules to the PGW 134 and/or other PCENs (not shown). PCRN 136 may be in communication with AN 150 via an Rx interface. PCRN 136 may receive requests from AN 150, SGW 132, or PGW 134. Upon receipt of a service request, PCRN 136 may generate at least one new PCC rule for fulfilling the service request.

PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

PCRN 136 may receive messages from the SGW 132 and PGW 134. These messages may both originate from the UE 110 and may be related to the same request by the UE 110. PCRN 136 may, for example, create sessions for the requests received through the SGW 132 and PGW 134 and may bind these sessions together when the messages are related. PCRN 136 may also ensure proper communication with the UE 110 when, for example, the UE 110 moves and communicates with a new SGW (not shown). The PCRN 136 may regulate the binding newly-established session through the new SGW so that the LTE 110 still has access to the packet data network through the PGW 134, while maintaining a binding between the session created through the PGW 134 and the sessions created through the various SGWs 132.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that includes an application function (AF) and provides an application service to user equipment 110. Thus, AN 150 may be a server or other device that provides, for example, a video streaming or voice communication service to user equipment 110. AN 150 may further be in communication with the PCRN 136 of the EPC 130 via an Rx interface. When AN 150 is to begin providing application service to user equipment 110, AN 150 may generate a request message, such as an AA-Request (AAR) according to the Diameter protocol, to notify the PCRN 136. This request message may include information such as an identification of the subscriber using the application service and an identification of the particular service data flows that must be established in order to provide the requested service. AN 150 may communicate such an application request to the PCRN 136 via the Rx interface.

Figure 2:
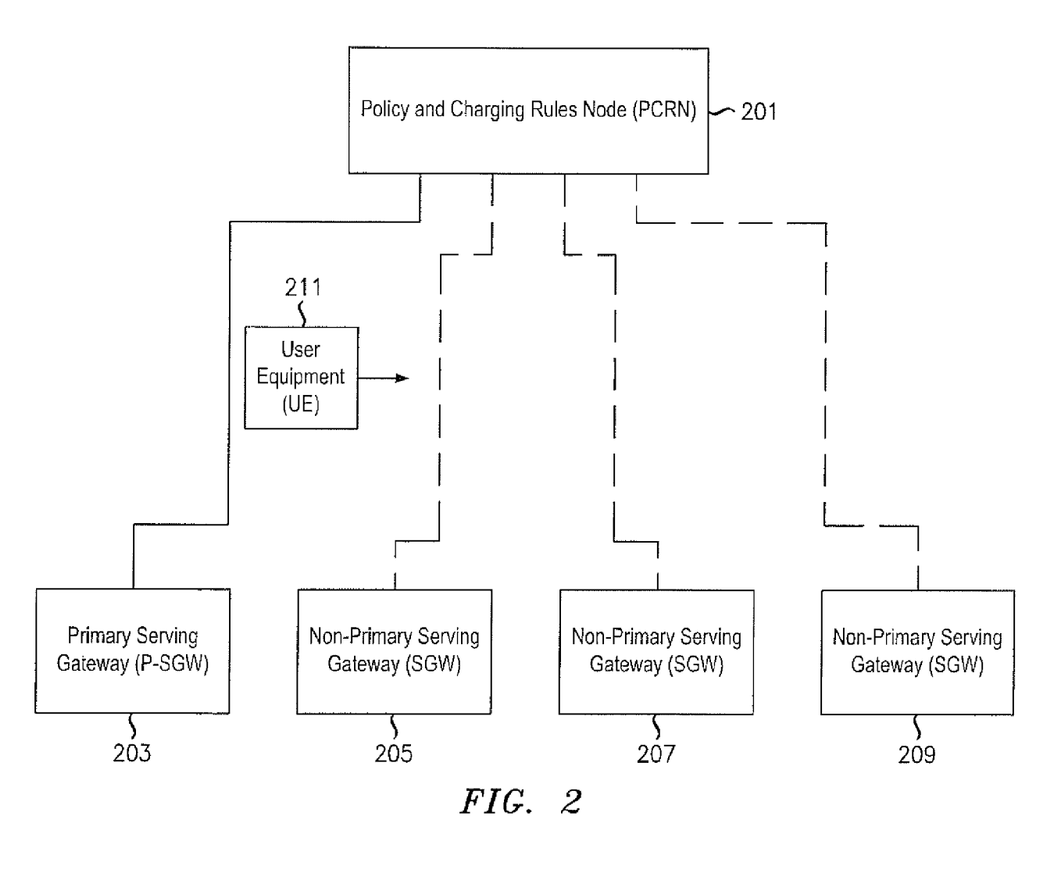
FIG. 2 illustrates an exemplary network for a Policy Charging and Rules Node (PCRN) to receive multiple requests from a plurality of serving gateways.

FIG. 2 illustrates an exemplary network for a PCRN to receive multiple requests from a plurality of serving gateways. The exemplary network 200 may include components of the EPC 140, including a policy and charging rules node (PCRN) 201, a packet data network gateway (PGW) 202, a plurality of serving gateways 203-209, and at least one piece of user equipment (UE) 211. The plurality of serving gateways 203-209 may include a primary serving gateway 203 and a plurality of secondary serving gateways 205-209. The network may receive requests, such as application requests that include gateway control session (GWC) and IP-CAN session establishment requests initiated by the UE 211.

The PCRN 201 may be similar to PCRN 136 of network 100. The PCRN 201 may receive multiple requests from the plurality of serving gateways 203-209. In various embodiments, the requests from the serving gateways 203-209 may be generated in response to a user request generated by UE 211. When multiple gateways 203-209 are capable of enabling connectivity for the UE 211, the PCRN 201 may designate one serving gateway from the plurality of serving gateways 203-209 to serve as a primary serving gateway (P-SGW) 203. PCRN 201 may also designate the other candidate serving gateways as non-primary serving gateways (SGW) 205-209.

PCRN 201 may base the assignment of the primary serving gateway on matching an established IP-CAN session within the PCRN 201 with one of a plurality of gateway control sessions, according to various attributes. In some embodiments, information in a Gxx command-code request (CCR) message received from P-SGW 203 and the information in a Gx CCR message received from PGW 202 should match in order to bind the IP-CAN session to the particular gateway control session. In other embodiments, the information may be included in attributes that may comprise a Session Binding Identifier (SBI). The SBI may include one or more attributes associated with a subscriber profile. Such attributes may include, for example, an IPv4 address (prefix), IPv6 address, session identification (session id), at least one subscription identifier, and Access Point Name (APN). In some embodiments, the IPv4 address and/or IPv6 prefix may comprise the Access Node Gateway Address (AN-GW-Address) of the gateway.

The PCRN 201 may create the SBI upon receipt of a Gx or Gxx message and may subsequently store the SBI when the session is established in the PCRN 201. Various embodiments may involve the PCRN 201 using other methods to determine the primary gateway using various criteria associated with each respective serving gateway 203-209 such as, for example, distance to the UE 211 and/or PCRN 201, propagation time, time shift, available capacity, and device load, among others.

Primary serving gateway (P-SGW) 203 may be assigned as the primary serving gateway by the PCRN 201 after transmitting a request to the PCRN 201. P-SGW 203 may generate a request in response to a received user request sent by UE 211. The request generated by P-SGW 203 may be a Gateway Control Session Establishment Request. The PCRN 201 may match the request transmitted by the P-SGW 203 to an established IP-CAN session stored in the PCRN 201. The IP-CAN session may be associated with a connection to a packet data network gateway (PGW), such as PGW 134 in system 100.

Over time, the User Equipment (UE) 211 may change locations. In some embodiments, the UE 211 may change locations while connected to the network. In these instances, multiple serving gateways 203-209, which may include the primary serving gateway (P-SGW) 203 and at least one secondary serving gateway (SGW) 205-209, may attempt to enable UE 211 connectivity to the network. In some embodiments, PCRN 201 may not initially determine which one of the candidate gateways 203-209 should act as the primary serving gateway. This failure of assignment may occur when the PCRN 201 uses an algorithm to determine a primary serving gateway (i.e., P-SGW 203), but does not actually produce an actual gateway from the candidate gateways 203-209 to serve as the primary. In such instances, the PCRN 201 may instead wait to receive a message from any of the candidate serving gateways 203-209 and may assign as primary the first serving gateway that forwarded as message to the PCRN 201. In some embodiments, the wait time may be configured through a system property. In other embodiments, the wait time may be configurable through a PCRN system administration portal. For example, a system property may set a default wait time of 2 seconds, while allowing a user to change the wait time to another value through the system administration portal.

Figure 3:
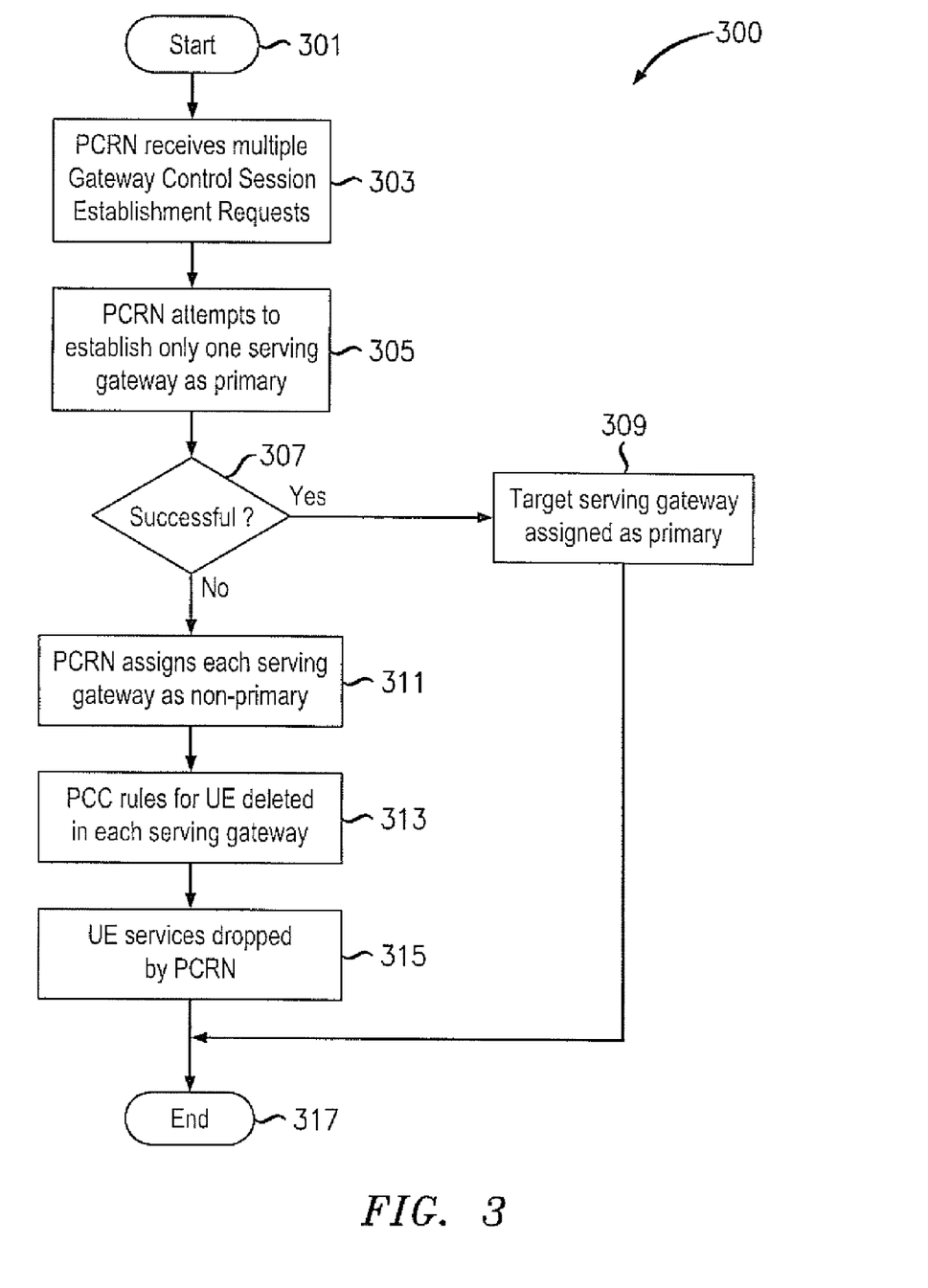
FIG. 3 illustrates an exemplary method for handling multiple requests from a plurality of serving gateways.

Referring now to FIG. 3, the figure illustrates an exemplary method for a PCRN of handling multiple requests from a plurality of serving gateways. PCRN 201 may implement method 300 when, for example, a UE 211 moves to a range where a plurality of serving gateways 203-209 may pick up the same message transmitted by UE 211 and attempt to forward the redundant message to the PCRN 201. The PCRN 201 may then attempt to only accept messages from one of the plurality of serving gateways in order to prevent the handling of redundant messages, which may result in the system hanging and the PCRN 201 not handling any of the requests transmitted by the UE 211.

Starting at steps 301-303, the PCRN 201 may receive multiple gateway control session requests from a plurality of serving gateways 203-209. The multiple gateway control session requests may constructed from a common request originating from a common UE 211. The PCRN 201 may then try in step 305 to bind at least one of the received gateway control sessions with an IP-CAN session established by a PGW 202.

The PCRN 201 may attempt to bind to the IP-CAN session the gateway control session among the number of gateway control session by using at least one criterion. The PCRN 201 may, for example, first determine if the information in the Gxx CCR message sent from one of the serving gateways 203-209 matches the Gx CCR message sent from the PGW 202. When only one incoming gateway control session fits this criterion, the PCRN 201 may attempt to assign the serving gateway 203-209 that sent the matching message as a primary serving gateway (P-SGW) 203. In some embodiments, there may still be multiple candidate messages that the PCRN 201 may potentially bind to the IP-CAN session. The PCRN 201 may compare sets of information included in both the IP-CAN session and the multiple gateway control sessions to assign one of the serving gateways 203-209 as the P-SGW. The specific steps involved in determining a primary serving gateway from a plurality of candidate gateways is discussed below with method 400 in relation to FIG. 4.

The PCRN 201 may then proceed to step 307, where the PCRN 201 determines whether the attempt to assign one of the serving gateways 201 as primary was successful. If the PCRN 201 was successful in establishing a P-SGW 203, it may then proceed to step 309, where the chosen target serving gateway may be assigned as P-SGW, with the gateway control session it contains being bound to the IP-CAN session by the PCRN 201.

If, however, the PCRN 201 was not successful in assigning a primary serving gateway, it may then proceed to step 311. The PCRN may fail to assign a primary serving gateway, for example, if the IP-CAN type information included within the gateway control session does not match the IP-CAN session established in the PCRN 201 or if the AN-GW-Address of the serving gateway creating the gateway control session does not match the AN-GW-Address of the IP-CAN session. A mismatch may occur when the address (or addresses) provided in the AN-GW-Address do not match the provided address or addresses in the IP-CAN session. In an instance where the AN-GW-Address of the serving gateway only includes the IPv6 prefix, for example, a mismatch of the IPv6 prefix may cause a mismatch. Similarly, in an instance where both the IPv4 address and the IPv6 prefix are provided as the AN-GW-Address, a mismatch of either the IPv4 address or the IPv6 prefix may cause a mismatch.

This mismatch may be due to the PGW either modifying the existing IP-CAN session or completely replacing the IP-CAN session with a substitute. During such occurrences, the system may hang, which may result in the PCRN 201 failing to execute requests made by the UE 211, but also failing to resolve the mismatch or retrying the connection.

Method 300 therefore proceeds to step 311, where the PCRN reassigns each of the serving gateways as non-primary. The assignment of each serving gateway to non-primary may, for example, unbind the mismatched IP-CAN session and gateway control session if they were bound. In some embodiments, the assignment of each serving gateway as non-primary may prevent the IP-CAN session from initially binding to any gateway control session.

In step 313, the rules for the UE 211 may be deleted in each of the serving gateways 203-209. The serving gateways may drop the rules in response to a signal generated by the PCRN 201 to kill the sessions in each gateway 202-209 relating to the UE 211. Consequently, the signal from the PCRN 201 may also cause the PGW 202 to delete the rules for the UE 211. In step 315, the PCRN 201 may also drop service to the UE 211, with the method 300 ending at step 317. The deletion of the sessions relating to the UE 211 in the gateways 202-209 and the PCRN 201 may temporarily drop service to the UE 211. However, completely dropping service may allow the UE 211 to retry connection to the PCRN 201 through the gateways 202-209. The subsequent attempt at reconnection may be more successful, with a higher probability of a gateway control session matching to an established IP-CAN session. The PCRN 201 thus may prevent the UE 211 requests by causing the UE 211 to reset when under conditions that may cause the UE 211 to hang.

Figure 4:
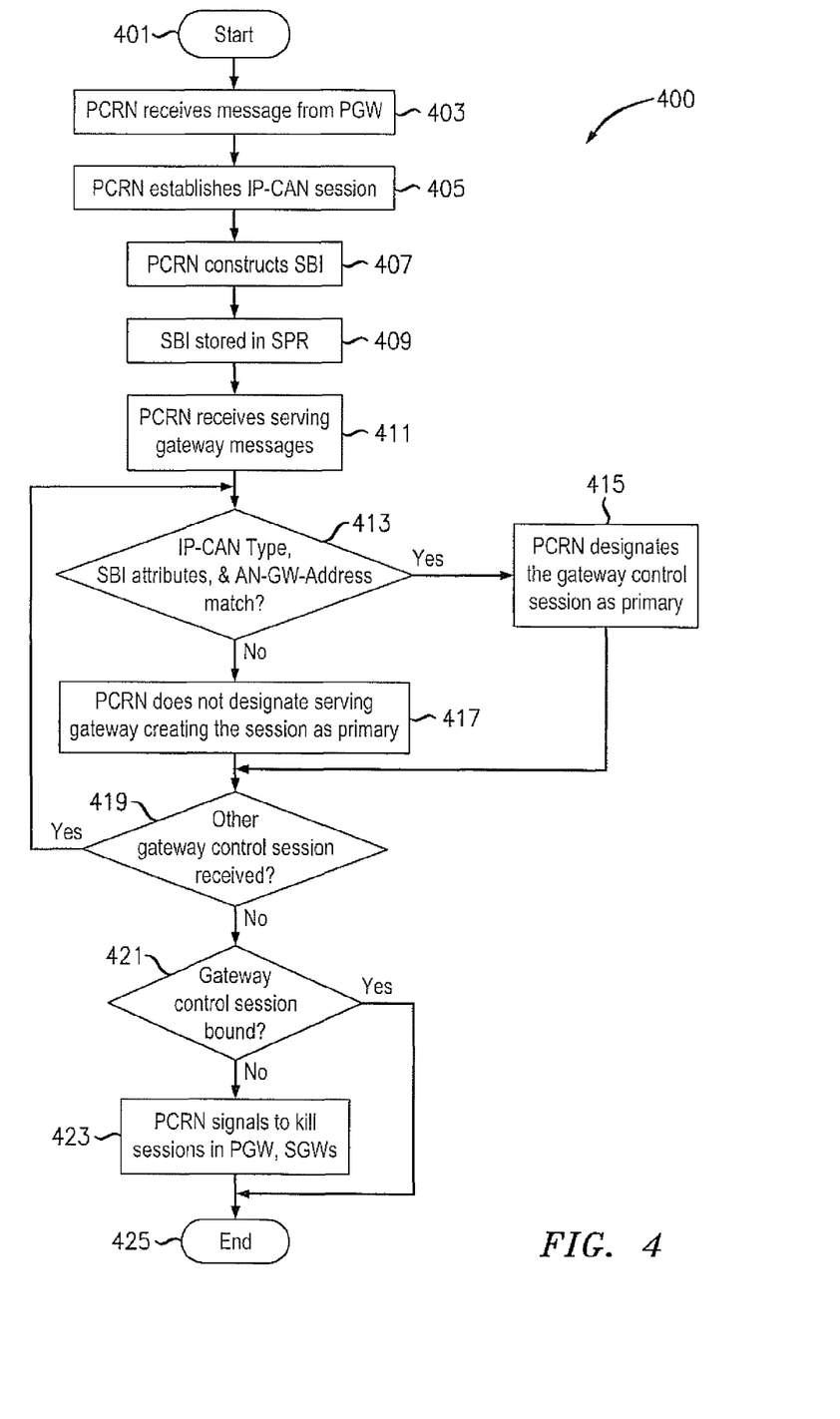
FIG. 4 illustrates an exemplary flowchart for binding an established IP-CAN session to a target gateway control session.

Referring to FIG. 4, an exemplary flowchart for binding an established IP-CAN session to a target gateway control session is illustrated. In steps 401-403, the PCRN 201 may receive a message from the PGW 202 that may include information to establish an IP-CAN session at the PCRN 201.

The message may also include information that the PCRN 201 may also use to construct a Session Binding Identifier (SBI). The information used to construct the SBI may be, for example, a message's session identification, IPv4 address, IPv6 prefix, at least one subscription identifier, and Access Point Name (APN). The PCRN 201 may then in step 407 construct an SBI using the information included in the message received from the PGW 203. In some embodiments, the message may not include all possible attributes that may be included in an SBI. The PCRN 201 may construct the SBI using the information that is available. The PCRN 201 may then in step 409 store the constructed SBI in SPR 138 via the Sp interface.

In step 411, the PCRN 201 may receive one or more messages from one or more serving gateways 203-209. In some embodiments, the PCRN 201 might attempt to appoint a primary serving gateway from the plurality of serving gateways 203-209, while assigning the remaining gateways as either non-primary or backup serving gateways. The PCRN 201 may base the assignment of the primary serving gateway 203, for example, on the best match with the established IP-CAN session according to the attributes of their respective SBIs.

In step 413, the PCRN 201 may check the attributes of one of the gateway control sessions with the attributes of the established IP-CAN session. This may involve, for example, the PCRN 201 first determining if the gateway control session's SBI contained a value for an attribute and when the SBI does contain an attribute value, the PCRN 201 then checking whether the information matches the SBI of the established IP-CAN session. In some embodiments, the potential gateway control session must possess an IP-CAN Type the same as the established IP-CAN session and an AN-GW-Address, comprising the IPv4 address and/or IPv6 prefix, matching the AN-GW-Address of the IP-CAN session. In some embodiments, all available attributes must match (i.e., the IPv4 addresses match, the IPv6 prefixes match, and the subscription IDs refer to the same subscriber) in order for the session to be bound. If the potential gateway control session SBI matches with the SBI of the established IP-CAN session, the PCRN 201 may in step 415 bind the potential gateway control session to the established IP-CAN session, while the PCRN 201 may store a record of the binding in a database. Otherwise, when one of the SBI attributes or the IP-CAN Type does not match, method 400 proceeds to step 417, where the potential gateway control session remains unbound from the established IP-CAN session.

Following either step 415 or step 417, in step 419, the PCRN 201 may determine whether there are other potential gateway control sessions that may bind to the established IP-CAN session. If there are, the PCRN may again in step 413 compare the IP-CAN Type, AN-GW-Address, and available SBI attributes to the established IP-CAN session. If the new potential gateway control session matches, the PCRN in step 415 may bind the new potential gateway control session as the primary serving gateway. In some embodiments, if there was already a gateway control session bound to the IP-CAN session with the serving gateway assigned as primary, the PCRN in step 415 may reassign this serving gateway as a non-primary serving gateway. In some embodiments, the gateway control session may remain bound to the IP-CAN session as non-primary. In other embodiments, the PCRN 201 may unbind the gateway control session from the IP-CAN session so that the IP-CAN session is only bound to the new potential gateway control session. When there are no other potential gateway control sessions to bind to the IP-CAN session, the PCRN may then proceed to step 421.

In step 421, the PCRN 201 may determine whether any of the potential gateway control sessions are actually bound to the IP-CAN session. If there is a gateway control session bound to the IP-CAN session, the PCRN 201 may determine that there is a primary serving gateway, thus allowing a connection to be established between the UE 211 and the PCRN 201. In such instances, the PCRN 201 may end the method 400 in step 425. Otherwise, if the PCRN 201 in step 421 determines that no gateway control sessions are bound to the IP-CAN session, the PCRN 201 may determine that it cannot process messages received from the serving gateways, as they are not bound to the IP-CAN session. The PCRN 201 may therefore in step 423 signal both the PGW 202 and the serving gateways 203-209 to kill the applicable sessions. This may include the IP-CAN session and the gateway control sessions associated with UE 211. The PCRN 201 may then end method 400 in step 425.

In some embodiments, the PGW 202 and serving gateways 203-209 may log the request to kill the sessions for the UE 211. In some embodiments, the PGW 202 and/or serving gateways 203-209 may attempt to correct the mismatch of sessions by resending the IP-CAN session and/or gateway control sessions through a session-release-cause Re-Authorization. Request (RAR). In other embodiments, the PGW 202 and/or serving gateways 203-209 may resend a Credit and Control Request (CCR) upon receipt of the kill signal from the PCRN 201.

Figure 5:
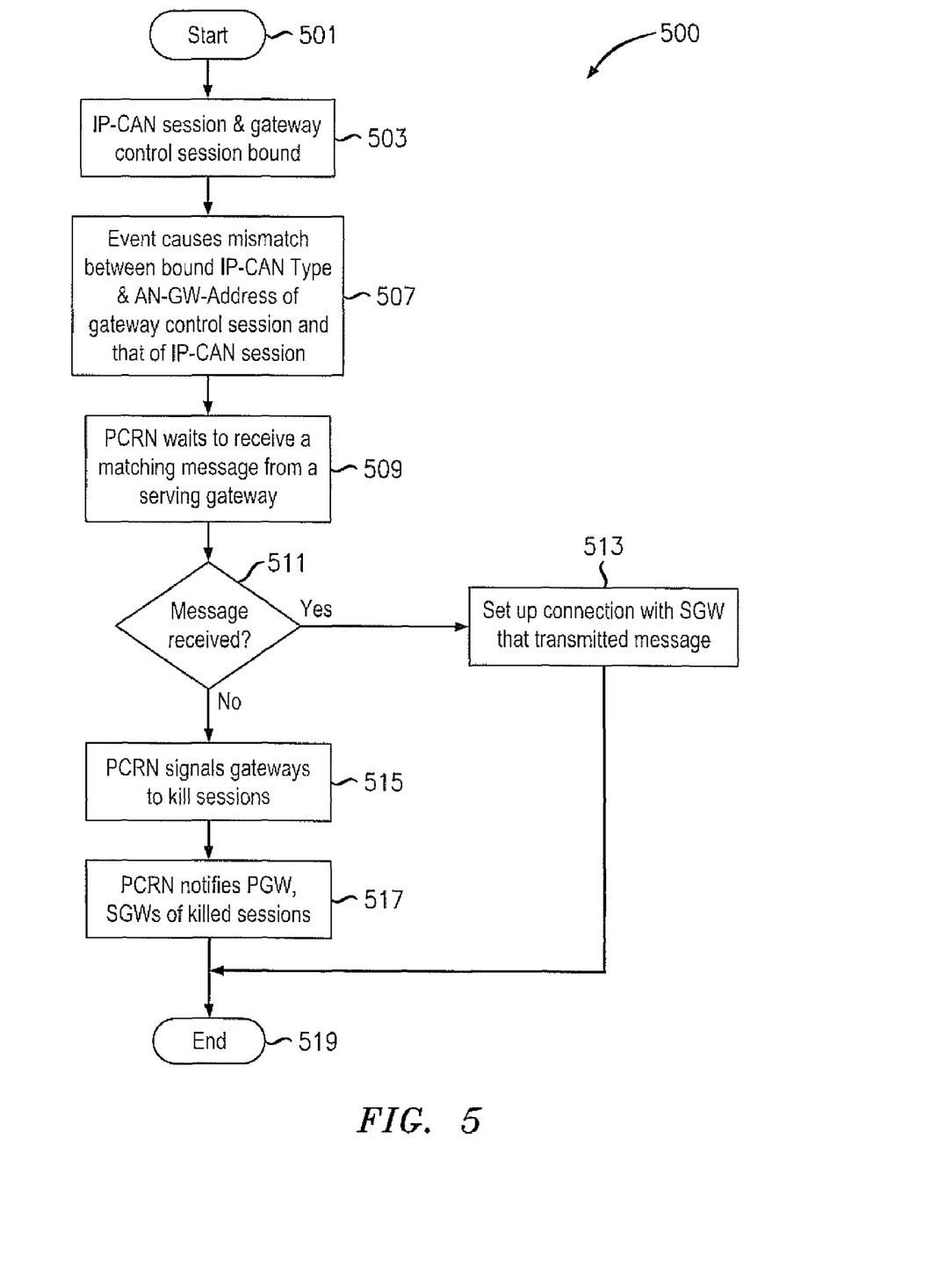
FIG. 5 illustrates an exemplary flowchart for handling a mismatch between an IP-CAN session and bound gateway control session.

Referring now to FIG. 5, an exemplary flowchart for handling a mismatch between an IP-CAN session and bound gateway control session is illustrated. In some instances after binding an IP-CAN session to a matching gateway control session, the two sessions might later mismatch. This may occur, for example, when the PGW 202 either modifies the existing IP-CAN session or completely replaces the IP-CAN session with a new, substitute IP-CAN session. This may also occur when the PGW 202 fails to send an updated IP-CAN session when the primary serving gateway (P-SGW) 203 updates the gateway control session; for example, when the PCRN 201 attempts a handover to a new SGW 205 and the new SGW 205 has a different IP-CAN Type that may not be capable of binding with the established IP-CAN session. Another example may be when the AN-GW-Address of the new gateway control session do not match the AN-GW-Address of the non-updated IP-CAN session. During such occurrences, the system may hang, which may result in the PCRN 201 failing to execute requests made by the UE 211, but also failing to resolve the mismatch or retrying the connection.

Starting at step 501-503, an IP-CAN session and a gateway control session are bound by the PCRN 201. The serving gateway that transmitted the message containing the bound gateway control session may have been assigned as the P-SGW 203. In step 507, an event may cause a mismatch between the IP-CAN session and the gateway control session such that no longer match. This mismatch may include the IP-CAN Type or AN-GW-Address of the gateway control session no longer matching those of the IP-CAN session. In some embodiments, the gateway control session's SBI no longer matches the SBI of the IP-CAN session. As discussed above, this may be due to updates in the IP-CAN session and/or gateway control session.

In step 509, the PCRN 201 may wait to receive a message from a serving gateway. The PCRN 201 may, upon detection of the mismatch that occurred in step 503, trigger the serving gateways 203-209 to send a new message to match the IP-CAN session. In some embodiments, the PCRN 201 may also trigger the PGW 202 to send a new message to establish a new IP-CAN session. The PCRN 201 may wait to receive a message from the P-SGW 203 or another SGW 203-209.

In step 511, the PCRN 201 may determine whether it has received at least one binding message from the PGW 202 and/or SGWs 203-209. If the PCRN 201 received at least one binding message, in step 513, the PCRN 201 may set up a connection with the SGW 203-209 that transmitted the new binding message. If the PCRN 201 received more than one binding message, the PCRN may implement method 400, where the PCRN 201 may compare multiple gateway control sessions, bind at least one gateway control session to the IP-CAN session, and assign as P-SGW 203 the serving gateway 203-209 that transmitted the last message that was bound to the IP-CAN session. If the PCRN 201 determines that it did not receive at least one binding message, the PCRN 201 in step 515 may signal the service gateways 203-209 and/or PGW 202 to kill the sessions associated with the UE 211. In some embodiments, the PCRN 201 does not attempt to kill any of the sessions at the PCRN 201, rather, asking the respective gateways to kill the sessions.

The PCRN in step 517 may then notify the PGW 203 and the serving gateways 203-209 that the sessions associated with the UE 211 were killed at their respective gateways. In some embodiments, the gateways may attempt to reconnect with subsequent messages containing an IP-CAN session or gateway control sessions. The PCRN 201 may therefore implement method 500 to prevent a hanging situation, as the notification to the gateways to kill sessions may trigger the gateways 202-209 and the PCRN 201 to establish a matched connection, rather than remaining in a hanging state.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A method performed by a Policy Charging and Rules Node (PCRN) for handling a user device in a wireless communications network, the method comprising:
    receiving a first request from a first serving gateway;
    receiving a second request from a second serving gateway;
    attempting to assign either the first or second serving gateway as a primary serving gateway for a session; and
    assigning at least the first and second serving gateways as non-primary when the attempt to assign the primary serving gateway is unsuccessful, wherein no other serving gateway is assigned as the primary serving gateway for the session.

2. The method of claim 1, further comprising:
    deleting rules in the first and second serving gateways when the attempt to assign the primary serving gateway is unsuccessful.

3. The method of claim 1, further comprising:
    dropping service by the first and second serving gateways when the attempt to assign the primary serving gateway is unsuccessful, the service comprising service by at least the first or second serving gateways to the user device.

4. The method of claim 1, wherein the at least one of the first and second requests is a Gateway Control Session Establishment Request.

5. A system for handling a user device in a wireless communications network, the system comprising:
    a Policy Charging and Rules Node (PCRN) that receives at least a first request from a first serving gateway and a second request from a second serving gateway, wherein the PCRN:
        attempts to assign either the first serving gateway or the second serving gateway as a primary gateway for a session, and
        assigns at least the first serving gateway and the second serving gateways as non-primary gateways for the session when the attempt to assign the primary serving gateway is unsuccessful, wherein no other serving gateway is assigned as the primary serving gateway for the session.

6. The system of claim 5, wherein the PCRN is further configured to delete rules in the first and second serving gateways when the attempt to assign the primary serving gateways is unsuccessful.

7. The system of claim 5, wherein the PCRN is further configured to drop service by the first and second serving gateways when the attempt to assign the primary serving gateway is unsuccessful, the service comprising service by at least the first or second serving gateway to the user device.

8. The system of claim 5, wherein the at least one of the first and second requests is a Gateway Control Session Establishment Request.

9. A method of a Policy Rules and Charging Node (PCRN) handling a user device in a wireless communications network, the method comprising:
    binding an IP-CAN session received from a Packet Data Network gateway (PGW) to a first gateway control session received from a first serving gateway, wherein the IP-CAN Type and an AN-GW-Address of the serving gateway matches that of the IP-CAN session;
    determining that the IP-CAN Type or the AN-GW-Address of the gateway control session no longer matches the IP-CAN session;
    waiting to receive a binding message from at least one of the first serving gateway and a second serving gateway;
    binding to the at least one of the first and second serving gateways when the PCRN receives the binding message from at least one of the first and second serving gateways and the gateway control session in the binding message contains an IP-CAN Type matching the IP-CAN session; and
    signaling the PGW and the at least first and second serving gateways to terminate each gateway control session and the IP-CAN session when the PCRN does not receive the binding message from at least one serving gateway containing an IP-CAN Type matching the IP-CAN session of the PGW.

10. The method of claim 9, the determining step further comprising:
    receiving an indication that the IP-CAN session in the PGW changed to a modified IP-CAN session wherein the IP-CAN Type of the gateway control session does not match the modified IP-CAN session.

11. The method of claim 9, the determining step further comprising:
receiving an indication that the PGW is using a second IP-CAN session to replace the IP-CAN session bound to the gateway control session, wherein the second IP-CAN session is of a different IP-CAN Type or a different AN-GW-Address than the IP-CAN session bound to the gateway control session.

12. The method of claim 9, the determining step further comprising:
receiving an indication that the serving gateway is using a second gateway control session to replace the gateway control session bound to the IP-CAN session, wherein the second gateway control session contains an IP-CAN Type or an AN-GW-Address that does not match the IP-CAN session.

13. The method of claim 9, further comprising:
receiving a message from the PGW after the signaling step, wherein the PGW resends the message after receiving the signal from the PCRN to terminate the IP-CAN session.

14. The method of claim 9, the connecting step further comprising:
connecting to the at least one of the first and second serving gateways when the PCRN receives the binding message from at least one of the first and second serving gateways and the gateway control session in the binding message contains an IP-CAN Type matching the IP-CAN session and a Session Binding Identifier (SBI) and the AN-GW-Address that matches the SBI and AN-GW-Address of the IP-CAN session.

15. A system for handling a user device in a wireless communications network, the system comprising:
at least a first and second serving gateway that receives a user request generated from the user device to establish a connection with the wireless communications network, the first gateway generating a first request and the second gateway generating the second request;
a Packet Data Network Gateway (PGW) that generates a establishing message to establish an IP-CAN session; and
a Policy Charging and Rules Node (PCRN) that receives at least the first and second requests from the first and second gateways, wherein the PCRN:
binds the IP-CAN session received in the establishing message from the PGW to a first gateway control session received from the first serving gateway, wherein the IP-CAN Type and an AN-GW-Address of the first serving gateway matches that of the IP-CAN session;
determines that the IP-CAN Type or the AN-GW-Address of the first gateway control session no longer matches the IP-CAN session;
waits to receive a binding message from at least one of the first and second serving gateways;
connects to the at least one of the first and second serving gateways when the PCRN receives the binding message from at least one of the first and second serving gateways and the gateway control session in the binding message contains an IP-CAN Type and AN-GW-Address matching the IP-CAN session; and
signals the PGW and the serving gateways to terminate the gateway control session and the IP-CAN session when the PCRN does not receive the binding message from at least one serving gateway containing an IP-CAN Type and AN-GW-Address matching the IP-CAN session of the PGW.

16. The system of claim 15, wherein the PCRN further comprises:
receiving an indication that the IP-CAN session in the PGW changed to a modified IP-CAN session, wherein the IP-CAN Type or the AN-GW-Address of the gateway control session does not match the modified IP-CAN session.

17. The system of claim 15, wherein the PCRN step further comprises:
receiving an indication that the PGW is using a second IP-CAN session to replace the IP-CAN session received in the establishing message, wherein the second IP-CAN session is of a different IP-CAN Type or AN-GW-Address than the IP-CAN session bound received in the establishing message.

18. The system of claim 15, wherein the PCRN further comprises:
receiving an indication that the serving gateway is using a second gateway control session to replace the gateway control session bound to the IP-CAN session, wherein the second gateway control session contains an IP-CAN Type or AN-GW-Address that does not match the IP-CAN session.

19. The system of claim 15, wherein the PCRN further comprises:
receiving a message from the PGW after the signaling step, wherein the PGW sends a second establishing message after receiving the signal from the PCRN to terminate the IP-CAN session.

20. The system of claim 15, wherein the PCRN further comprises:
connecting to the at least one of the first and second serving gateways when the PCRN receives the binding message from at least one of the first and second serving gateways and the gateway control session in the binding message contains an IP-CAN Type matching the IP-CAN session and a Session Binding Identifier (SBI) and AN-GW-Address that matches the SBI and AN-GW-Address of the IP-CAN session.

* * * * *